United States Patent
Valliath et al.

(10) Patent No.: US 6,956,544 B2
(45) Date of Patent: Oct. 18, 2005

(54) DUAL MODE DISPLAY

(75) Inventors: George T. Valliath, Winnetka, IL (US); Zili Li, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/904,685

(22) Filed: Nov. 23, 2004

(65) Prior Publication Data

US 2005/0134528 A1   Jun. 23, 2005

Related U.S. Application Data

(60) Provisional application No. 60/531,720, filed on Dec. 22, 2003.

(51) Int. Cl.[7] ............................................... G09G 3/00
(52) U.S. Cl. ........................................... 345/32; 345/7
(58) Field of Search ........................ 345/7.8, 107, 74, 345/84, 87, 88, 98, 204, 72, 32; 349/96; 359/485, 359/462, 441, 565, 569, 809, 810, 823; 455/550, 455/566; 463/31, 34; 379/93.17

(56) References Cited

U.S. PATENT DOCUMENTS

| | | | |
|---|---|---|---|
| 6,073,033 A | * | 6/2000 | Campo ........................ 455/566 |
| 6,140,986 A | * | 10/2000 | Wilkinson et al. ......... 345/74.1 |
| 6,642,977 B2 | * | 11/2003 | Kotchick et al. ............. 349/96 |
| 2002/0145573 A1 | * | 10/2002 | Cheng ............................ 345/7 |
| 2003/0067457 A1 | * | 4/2003 | Maeda ........................ 345/204 |
| 2004/0032391 A1 | * | 2/2004 | Liang et al. ................ 345/107 |

* cited by examiner

Primary Examiner—Vijay Shankar
Assistant Examiner—Nitin Patel

(57) ABSTRACT

A dual mode display (100) includes a monochrome reflective direct view display (110) and a full color virtual display (150) located behind the monochrome reflective direct view display. The monochrome reflective direct view display includes a display panel (112) having a first pixel arrangement and a narrowband reflector (114) located behind the display panel. The virtual display has a second pixel arrangement, wherein each pixel emits light in one of three primary color bands through the monochrome reflective direct view display, and wherein the light emitted by each pixel, in combination with light emitted by other pixels of the virtual display, generates a full color virtual image from the dual mode display. In one embodiment the virtual display is a virtual high information content display and the three primary color bands (205, 210, 215) do not overlap a first color band of the narrowband reflector (220).

19 Claims, 2 Drawing Sheets

DUAL MODE DISPLAY

BACKGROUND

Mobile communication devices are increasingly able to access information over high bandwidth wireless networks. GPRS (2.5G) is already widely available and 3G is emerging. One problem is that the small display typically found in handheld devices limit the information that can be seen. This can be resolved using a virtual display. But a problem with this approach is that for most activities, such as dialing, a virtual display is very inconvenient. Furthermore, conventional virtual displays consume a great deal of power. A solution then is to use two displays: a virtual display and a low information content, direct view display. A consequent problem is that presence of the two displays uses up valuable surface area and is difficult to render in a pleasing design.

BRIEF DESCRIPTION OF THE DRAWINGS

The present invention is illustrated by way of example and not limitation in the accompanying figures, in which like references indicate similar elements, and in which.

Figure 1:
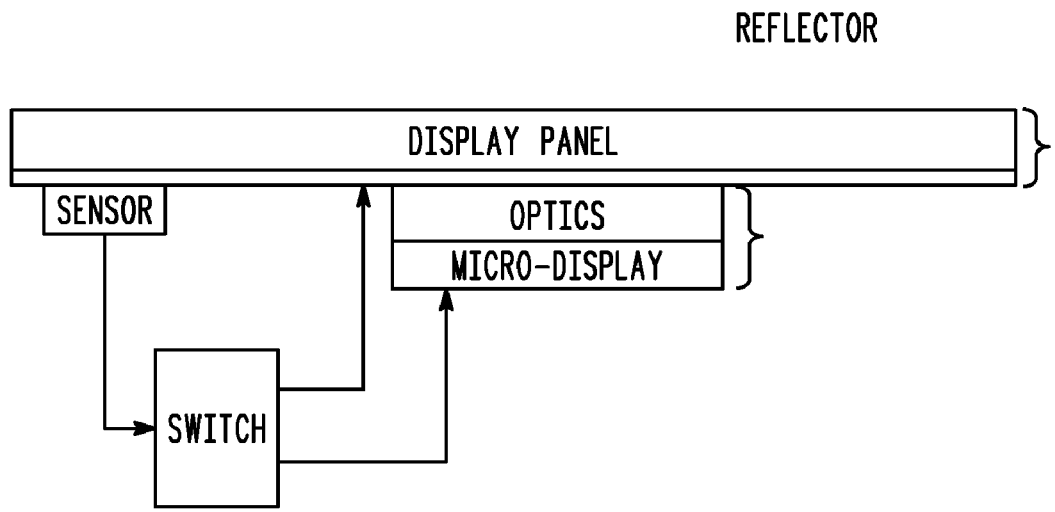
FIG. 1 is a combined elevation view and electrical block diagram of a dual mode display, in accordance with a first embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail the particular dual mode display in accordance with the present invention, it should be observed that the present invention resides primarily in combinations of method steps and apparatus components related to the dual mode display. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

Referring to FIG. 1, a combined elevation view and electrical block diagram of a dual mode display 100 is shown, in accordance with embodiments of the present invention. The dual mode display 100 comprises a monochrome reflective direct view display 110 and a virtual display 150. The monochrome reflective direct view display 110 comprises a display panel 112 having a first pixel arrangement and a narrowband reflector 114 located behind the display panel 112. The display panel 112 may be a liquid crystal display panel that uses cholesteric, twisted nematic or super twisted nematic type liquid crystal display configurations, and may be passive (i.e., driven using an electrode matrix) or active (i.e., driven using an electrode-and-thin-film-(transparent)-transistor (TFT) matrix), or may be a transparent display of any technology, such as an organic light emitting display, as is well known in the art. In the form in which the display panel 112 is distributed, it may include one or more polarizers and may include other films (e.g., an anti-reflective film) that are new or known in the art.

The virtual display 150 is located behind the narrowband reflector 114 and is preferably a high information content, high pixel density, full color, light emitting virtual display that comprises a micro-display 160 having a second pixel arrangement and optics 170. The micro-display 160 may be of any suitable technology, such as liquid crystal with a light source or organic light emitting display (OLED). As for conventional virtual displays, the second pixel arrangement of the micro-display 160 is substantially (i.e., at least 10 times and may be on the order of up to 300 times) more dense than the pixel arrangements for typical low information direct view displays, and in particular is substantially more dense than the monochrome reflective direct view display 110. For example, the micro-display 160 may have a high pixel density on the order of 3,000 to 10,000 full color pixels per square millimeter, while the monochrome reflective direct view display 110 may have a density on the order of 30 to 100 pixels per square millimeter. Also, in accordance with the embodiments of the present invention, the virtual display 150 has a high information content, on the order of 300,000 to 800,000 full color pixels (for example, 800×600 full color pixels).while the monochrome reflective direct view display 110 has a low information content on the order of 700 to 10,000 monochrome pixels (for example, 100×50 monochrome pixels). Thus, the ratio of the information content of the virtual display 150 to the monochrome reflective direct view display 110 may range from approximately 30 to more than 1000. As examples, the virtual display 150 may be of the type that has three monochrome primary color pixels that are driven simultaneously to generate the color for each full color pixel, or may be the sequential type, i.e., one that generates three monochrome primary color images sequentially at a high rate, such as at least 75 monochrome images per second, to generate perceived full color pixels, or may be a scanning display. The virtual display 150 emits light through the optics 170 and the monochrome reflective direct view display 110 in the form of a virtual image. The optics 170 comprise one or more lenses that magnify the otherwise small micro-image generated by the micro-display 160 into a much larger (generally at least 10× larger) virtual image focused in a proper position for easy viewing of human eyes, as is well known in the art. When the dual mode display 100 is positioned very close to the eye of a user, the light emitted by a combination of the pixels of the virtual display 150 thereby generates a full color image from the dual mode display 100. Preferably, the monochrome reflective direct view display 110 is off when the virtual display 150 is on. The monochrome reflective direct view display 110 is preferably configured such that it has a maximum transmission state in its off state, in order to minimize attenuation of the luminance from the virtual display 150. When the virtual display 150 has a polarization sensitive liquid crystal micro-display 160, this can be accomplished by aligning the exit polarization direction of the light from the virtual display 150 to be parallel with the rear polarization direction of the monochrome reflective direct view display 110 (in its off state) to minimize light attenuation of the virtual display 150 by the monochrome reflective direct view display 110. The control of this switching is discussed below. The rear polarization direction of the monochrome reflective direct view display 110 in its off state is called the static polarization of the monochrome reflective direct view display 110.

Figure 2:
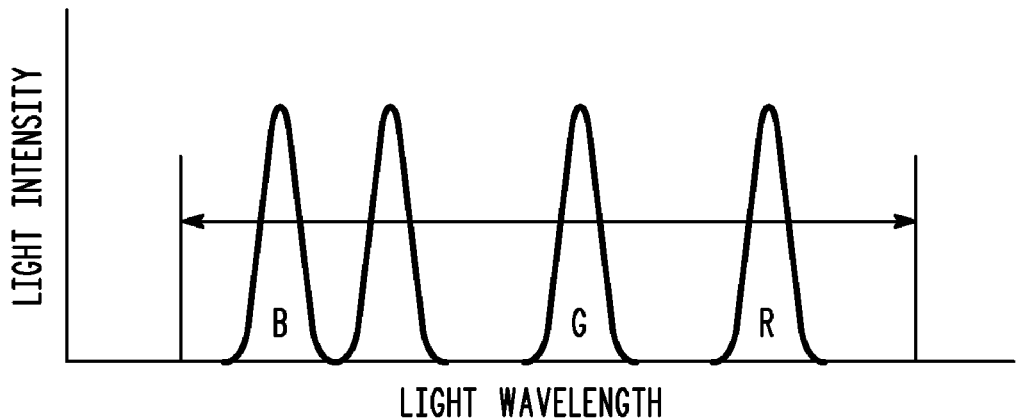
FIGS. 2 and 3 are light intensity diagrams, in accordance with the embodiments of the present invention.

Referring to FIG. 2, a light intensity diagram is shown in accordance with embodiments of the present invention. Examples of the light intensity of three primary color bands that may be emitted by the virtual display 150 when all three colors are emitting at maximum intensity are shown as the plots 205, 210, 215. The exact bandwidths, maximum intensities, and center wavelengths of the three colors are chosen using well known techniques so that when they are appropriately combined and viewed, colors within a large portion of the visible light spectrum 201 are perceived by typical users; i.e., they are primary colors, which in this example are labeled B, G, R for blue, green, and red. (The optimum maximum intensities may be unequal, not as they are shown in FIG. 2). Whether the monochrome direct view display 110 is on or off, the display panel 112 transmits at least a broad band of incident visible light to the narrowband reflector 114. At least when the monochrome direct view display 110 is on, the narrowband reflector 114 reflects through the display panel essentially only the incident light within a first color band, such as the color band 220, that is between blue 205 and green 210 in FIG. 2. By applying appropriate biases to the electrode matrix of the display panel 112, a monochrome image may be produced having a color determined by the color band 220. The image may be a "gray scale" image, i.e., using pixels of varying intensity; or a simple, high contrast character display in which each pixel is at maximum or minimum contrast ratio. It is anticipated that a high contrast character display would typically be used, to present low information content text messages that could include messages that direct the user's attention to the high information content, virtual display 150. In accordance with the first embodiment of the present invention shown in FIG. 2, the three color bands essentially do not overlap the first color band.

Figure 3:
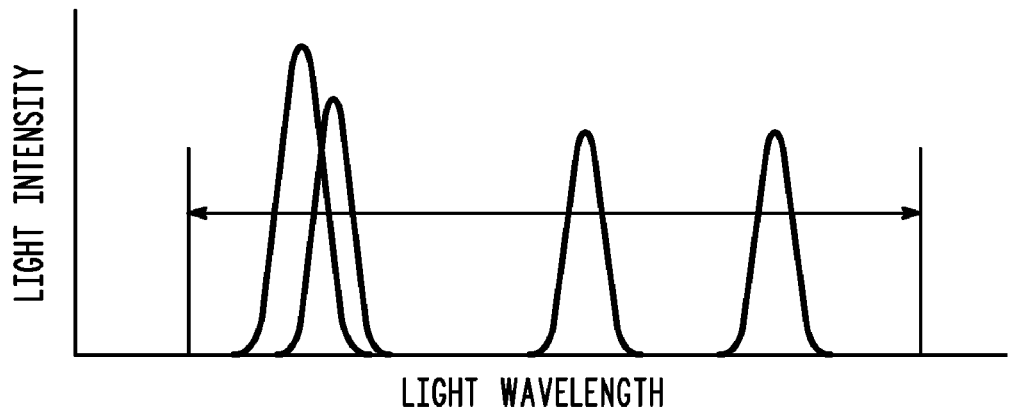

Referring to FIG. 3, a light intensity diagram is shown in accordance with embodiments of the present invention. In this version, at least one of the three color bands overlaps the first band. In the example shown in FIG. 3, the first color band 320 overlaps the primary color band 305. The color levels for the three color bands 305, 310, 315 are modified to compensate for an attenuation of the light emitted by the virtual display 150 within the first band that is caused by the narrowband reflector 114. This is illustrated in FIG. 3 by a higher maximum level of intensity for color band 305 in comparison to those of color bands 310, 315. As in FIG. 2, the optimized maximum levels may vary from those implied by FIG. 3—for example, the maximum optimized levels for color bands 310, 315 may be different due to the actual bandwidths of each emitted primary color 305, 310, 315, or due to the difference in perception of the intensities by typical users.

Referring again to FIG. 1, the dual mode display 100 may further comprise a switch means for switching the dual mode display 100 between a direct view mode and virtual view mode. In accordance with embodiments of the present invention, the switch means may be automatic means or manual means and comprises sensor 180 and switch 190. For automatic switching, the sensor 180 can be any type of sensor that can provide measurement of an attribute that can be analyzed to determine how close the dual mode display 100 is to a user's face. Some examples are an image sensor, a light detector, a light emitter/detector pair, and a speaker/microphone pair. At least when the sensor 180 is a light sensor, it may conveniently be located behind the display panel 110, since light from most light bands will pass through the display panel 110 whether the display panel 110 is on or off. The sensor 180 is coupled to the switch 190 by sensor signal 181. The switch 190 is a function within the electronic device that analyzes the sensor signal 181 and turns the monochrome direct view display on and the virtual display off, or vice versa. The switch 190 is implemented by a microprocessor or other processing unit that responds to stored program instructions, although in some simple embodiments, it may be implemented using application specific analog and digital circuits. The user can also perform a manual input, such as entering a command using a keyboard, or activating a dedicated electrical switch that turns the dual mode display 100 on or off, while, for example also turning on or off most other energy using sections of the electronic device. If, for example, the sensor 180 is an image sensor, the switch 190 may analyze edge patterns of the image to make a decision that an iris and pupil have been imaged, or in a more sophisticated version, a retinal scan could be performed. In another example, the light emitter/detector pair or speaker/microphone may be used to analyze reflected light or sound to detect proximity of a surface. The accuracy of the detection will of course, in general, be related to the complexity of the technology of the switch means.

As described above, the alternative switch means may be manual. For manual switching, the sensor 180 can be any type of sensor 180 that can provide measurement of a user action that is other than the user moving the dual mode display 100 close to the user's face, such as a manual switch actuator or a microphone that transduces a user's speech. The switch 190 is again a function within the electronic device that analyzes the sensor signal 181 and alternatively turns the monochrome direct view display on and the virtual display off, or vice versa. The switch 190 is implemented as described above, although the stored program instructions and/or circuit design would be different.

When the virtual display 150 is on, the narrowband reflector 114 transmits light that is within the three primary color bands 205, 210, 215 from the virtual display 150 to the display panel 112. Preferably, as described above, the monochrome reflective direct view display 110 is turned off by the switch means. When the monochrome reflective direct view display 110 is turned off, it must have sufficient transparency to allow the virtual image generated by the virtual display 150 to have sufficient brightness for reliable reading under prescribed ambient light conditions. Thus, when the micro-display 160 is polarization based (e.g., twisted nematic LCD), the monochrome reflective direct view display 110 preferably transmits approximately 60% or more of the light that is within the three primary color bands emitted by the micro-display 160 (when the monochrome reflective direct view display 110 is off). When the micro-display 160 is emissive based (such as an OLED micro-display) the monochrome reflective direct view display 110 preferably transmits approximately 30% or more of the light that is within the three primary color bands emitted by the micro-display 160 (when the monochrome reflective direct view display 110 is off). The narrowband reflector 114 may be a static narrowband reflector of any suitable technology (such as plastic film), and could alternatively be a switched narrowband reflector.

The virtual display 150 can be any display technology for which the pixels can be arranged in the density required of a virtual display. Two examples are liquid crystal display (LCD) technology and organic light emitting display (OLED) technology. An LCD virtual display 150 comprises a liquid crystal material layer and a light source. The liquid crystal material layer preferably has a static polarization optimized for maximum contrast ratio of the virtual display 150 when the monochrome direct view display 110 is off and the virtual display 150 is on. The virtual display 150 of LCD technology may be one of a static backlit color display (having three monochrome pixels to form each color pixel of a color pixel matrix) or a sequential backlit color display (having one monochrome pixel and a sequential light source), as are known in the art.

The monochrome reflective direct view display 110 typically consumes at least an order of magnitude less power when turned on than the virtual display 150 when it is turned on, which is to say, the dual mode display 100 consumes 90 per cent less power when the monochrome reflective direct view display 110 is turned on than when the full color virtual display 150 is turned on. Thus, significant advantages of the dual mode display 100 include the availability of a high information content display in a very small package, the ability to receive and send small information messages without having to bring the electronic device that includes the dual mode display 100 to one's face, and a display arrangement that does not consume, on the average, much more power than a passive, monochrome reflective direct view display in many applications for which the need to use a high information display are intermittent.

Figure 4:
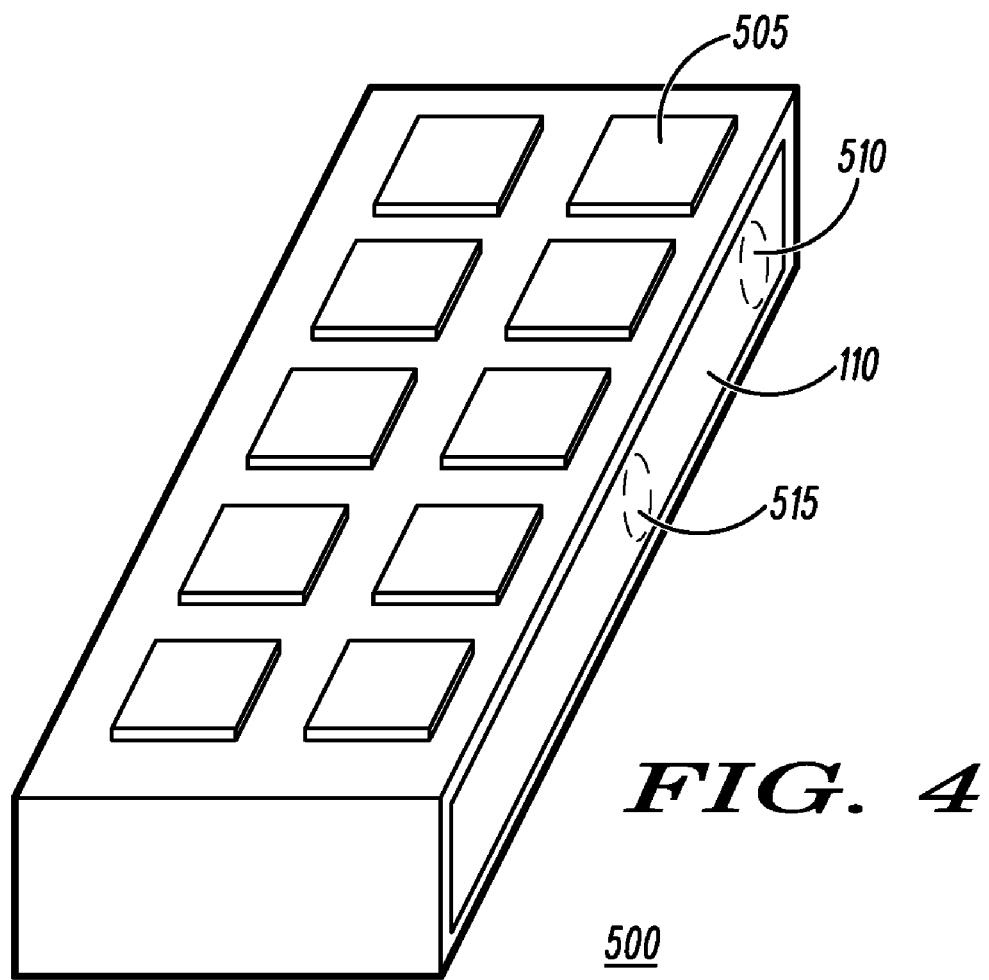
FIG. 4 is a perspective view of an electronic device that incorporates a dual mode display, in accordance with some embodiments of the present invention.

Referring to FIG. 4, a perspective view of an electronic device 500 that incorporates a dual mode display 100, 500 is shown, in accordance with the embodiments of the present invention. This perspective view illustrates just one arrangement for an electronic device 500 that uses one of the dual mode displays 100. The electronic device 500 is a portable electronic device that comprises a battery (not shown in FIG. 4), a plurality of small key switches 505 and one of the dual mode displays 100. A sensor location 510 and a virtual display location 515 are indicated on a front of the monochrome reflective direct view display 110. This electronic device 500 represents small electronic devices, for example a small but full function remote control (such as may be used for controlling large capacity compact disk changers) or a small messaging device, such as a cellular telephone. The electronic device 500 may be conveniently left on a desk or counter top. Low information messages can be sent and received using the monochrome reflective direct view display, but when high information interaction with the user is needed, an alert can be displayed on the monochrome reflective direct view display to advise the user to pick up the electronic device and look at the information imaged by the virtual display. It will be appreciated that in an alternative embodiment a stereoscopic full color display can be provided by disposing two virtual displays 150 of the virtual type behind the monochrome reflective direct view display 110 and providing appropriately adjusted image information to each virtual display 150.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms "including" and/or "having", as used herein, are defined as comprising. The term "coupled", as used herein with reference to electro-optical technology, is defined as connected, although not necessarily directly, and not necessarily mechanically.

The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

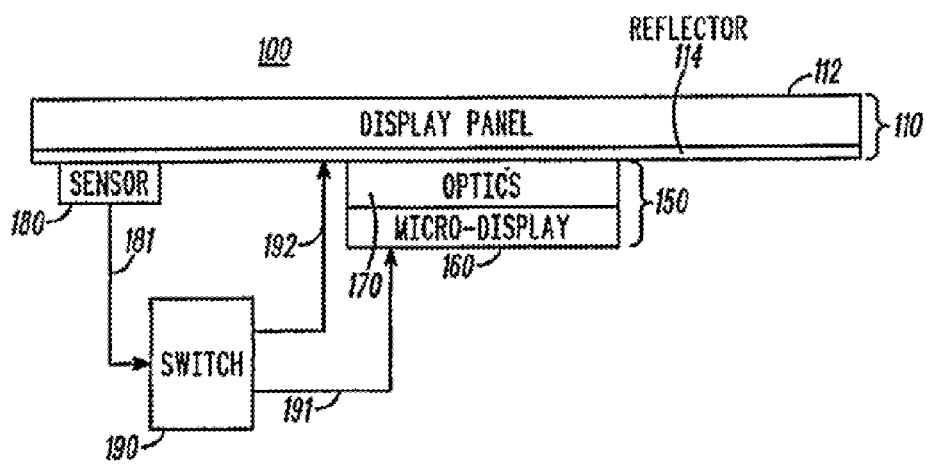

What is claimed is:

1. A dual mode display, comprising:
   a monochrome reflective direct view display, comprising:
      a display panel having a first pixel arrangement; and
      a narrowband reflector located behind the display panel; and
   a full color virtual display located behind the narrowband reflector, having a second pixel arrangement, wherein each pixel emits light in one of three primary color bands through the monochrome reflective direct view display, and wherein the light emitted from each pixel, in combination with light emitted by other pixels of the full color virtual display, generates a full color virtual image from the dual mode display.

2. The dual mode display according to claim 1,
   wherein the display panel transmits a broad band of incident visible light to the narrowband reflector, and
   wherein the narrowband reflector reflects to the display panel essentially only light within a first color band and transmits light that is within the three primary color bands from the full color virtual display to the display panel.

3. The dual mode display according to claim 2, wherein the monochrome reflective direct view display transmits at least 30% of the light that is within the three primary color bands emitted by the full color virtual display when the monochrome reflective direct view display is off.

4. The dual mode display according to claim 1, wherein the narrowband reflector is a holographic reflector.

5. The dual mode display according to claim 1, wherein the three primary color bands essentially do not overlap the first band.

6. The dual mode display according to claim 1, wherein at least one of the three primary color bands overlaps the first color band and wherein color levels for the three primary color bands are modified to compensate for an attenuation, by the narrowband reflector, of light emitted by the full color virtual display within the first color band.

7. The dual mode display according to claim 1, wherein the full color virtual display comprises a liquid crystal micro-display, a light source, and optics, and wherein the liquid crystal micro-display has a static polarization optimized for minimum virtual image attenuation by the monochrome reflective direct view display.

8. The dual mode display according to claim 1, wherein the full color virtual display comprises an organic light emitting micro-display and optics.

9. The dual mode display according to claim 1, wherein the full color virtual display is a high information content display and the monochrome reflective direct view display is a low information content display.

10. The dual mode display according to claim 1, wherein the ratio of full color pixels in the full color virtual display to monochrome pixels in the monochrome reflective direct view display is at least 30.

11. The dual mode display according to claim 1, wherein the display panel is one of an active and a passive liquid crystal display panel.

12. The dual mode display according to claim 1, wherein the display panel is one of a twisted nematic and a super twisted nematic display panel.

13. The dual mode display according to claim 1, wherein the display panel is a transparent display.

14. The dual mode display according to claim 1, further comprising a switch means for switching the dual mode display between a direct view mode and virtual display view mode.

15. The dual mode display according to claim 1, wherein the switch means comprises one of a manual means and an automatic means.

16. The dual mode display according to claim 1, wherein the automatic means comprises at least one of an ambient light sensing means, a sound reflection means, a light reflection means, a pattern sensing means, and a retinal sensing means.

17. The dual mode display according to claim 1, wherein the dual mode display consumes 90 per cent less power when the monochrome reflective direct view display is turned on than when the full color virtual display is turned on.

18. An electronic device comprising:
a dual mode display, comprising:
  a monochrome reflective direct view display, comprising:
    a display panel having a first pixel arrangement; and
    a narrowband reflector located behind the display panel; and
  a full color virtual display located behind the narrowband reflector, having a second pixel arrangement, wherein each pixel emits light in one of three primary color bands through the monochrome reflective direct view display, and wherein the light emitted from each pixel, in combination with light emitted by other pixels of the full color virtual display, generates a full color virtual image from the dual mode display; and
a switch means.

19. A method for fabricating a dual mode display, comprising:
disposing a narrowband reflector behind a display panel of a monochrome reflective direct view display, wherein the display panel has a first pixel arrangement; and
disposing a full color virtual display behind the narrowband reflector, wherein the full color virtual display has a second pixel arrangement, and wherein each pixel emits light in one of three primary color bands through the monochrome reflective direct view display, and wherein the light emitted by each pixel, in combination with light emitted by other pixels of the full color virtual display, generates a full color image from the dual mode display.

* * * * *

UNITED STATES PATENT AND TRADEMARK OFFICE
CERTIFICATE OF CORRECTION

PATENT NO.        : 6,956,544 B2
APPLICATION NO.   : 10/904685
DATED             : October 18, 2005
INVENTOR(S)       : George T. Valliath and Zili Li It is certified that error appears in the above-identified patent and that said Letters Patent is hereby corrected as shown below:

The Title Page, showing an illustrative figure, should be deleted and substitute therefor the attached title page.

Delete drawings sheets 1-2 and substitute therefor the drawing sheets, consisting of figs. 1-3 as shown below.

The figures on this sheet have been corrected by adding the missing reference numbers.

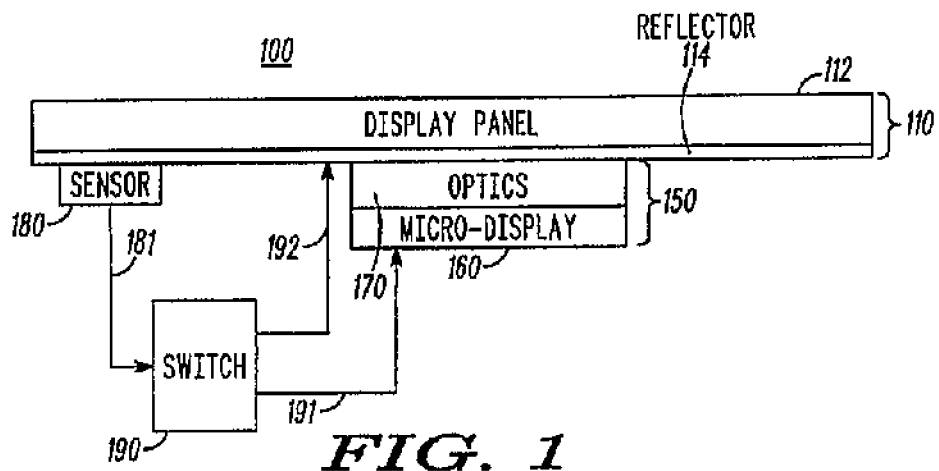

FIG. 1

The figures on this sheet have been corrected by adding the missing reference numbers.

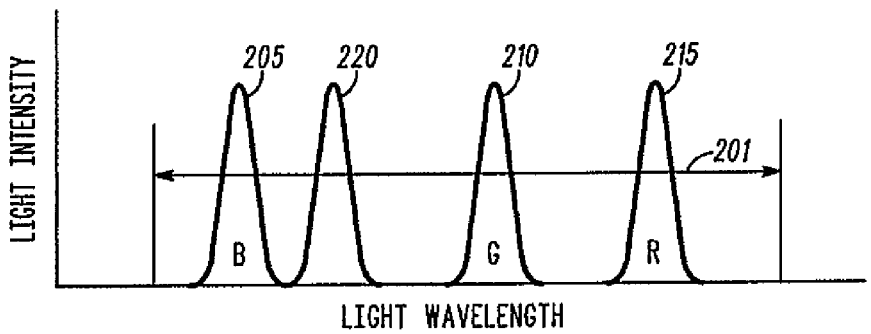

FIG. 2

UNITED STATES PATENT AND TRADEMARK OFFICE
CERTIFICATE OF CORRECTION

PATENT NO.       : 6,956,544 B2
APPLICATION NO.  : 10/904685
DATED            : October 18, 2005
INVENTOR(S)      : George T. Valliath and Zili Li Page 2 of 3

It is certified that error appears in the above-identified patent and that said Letters Patent is hereby corrected as shown below:

The figures on this sheet have been corrected by adding the missing reference numbers.

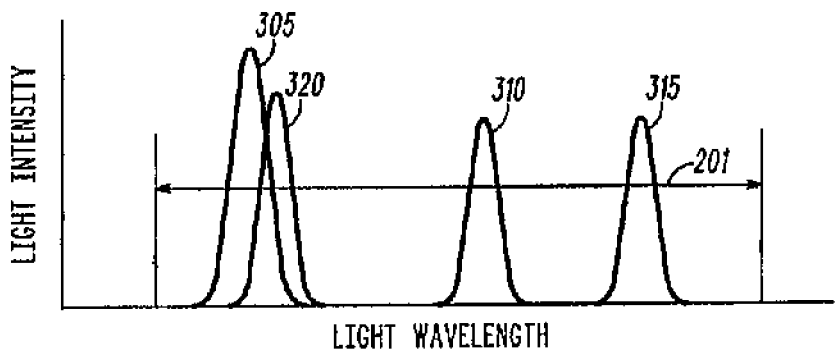

FIG. 3

Signed and Sealed this

Thirtieth Day of October, 2007

JON W. DUDAS
*Director of the United States Patent and Trademark Office*

(12) United States Patent
Valliath et al.

(10) Patent No.: US 6,956,544 B2
(45) Date of Patent: Oct. 18, 2005

(54) DUAL MODE DISPLAY

(75) Inventors: George T. Valliath, Winnetka, IL (US); Zili Li, Barrington, IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 10/904,685

(22) Filed: Nov. 23, 2004

(65) Prior Publication Data
US 2005/0134528 A1  Jun. 23, 2005

Related U.S. Application Data

(60) Provisional application No. 60/531,720, filed on Dec. 22, 2003.

(51) Int. Cl.$^7$ ............................................. G09G 3/00
(52) U.S. Cl. ......................................... 345/32; 345/7
(58) Field of Search ..................... 345/7.8, 107, 74, 345/84, 87, 88, 98, 204, 72, 32; 349/96; 359/485, 359/462, 441, 565, 569, 809, 810, 823; 455/550, 455/566; 463/31, 34; 379/93.17

(56) References Cited

U.S. PATENT DOCUMENTS

| | | | |
|---|---|---|---|
| 6,073,033 A | * | 6/2000 | Campo .................... 455/566 |
| 6,140,986 A | * | 10/2000 | Wilkinson et al. ........ 345/74.1 |
| 6,642,977 B2 | * | 11/2003 | Kotchick et al. ............ 349/96 |
| 2002/0145573 A1 | * | 10/2002 | Cheng ............................ 345/7 |
| 2003/0067457 A1 | * | 4/2003 | Maeda ........................ 345/204 |
| 2004/0032391 A1 | * | 2/2004 | Liang et al. ................. 345/107 |

* cited by examiner

*Primary Examiner*—Vijay Shankar
*Assistant Examiner*—Nitin Patel

(57) ABSTRACT

A dual mode display (100) includes a monochrome reflective direct view display (110) and a full color virtual display (150) located behind the monochrome reflective direct view display. The monochrome reflective direct view display includes a display panel (112) having a first pixel arrangement and a narrowband reflector (114) located behind the display panel. The virtual display has a second pixel arrangement, wherein each pixel emits light in one of three primary color bands through the monochrome reflective direct view display, and wherein the light emitted by each pixel, in combination with light emitted by other pixels of the virtual display, generates a full color virtual image from the dual mode display. In one embodiment the virtual display is a virtual high information content display and the three primary color bands (205, 210, 215) do not overlap a first color band of the narrowband reflector (220).

19 Claims, 2 Drawing Sheets